July 29, 1941.           B. R. TUCKER            2,251,084
              FUEL VAPORIZER FOR INTERNAL COMBUSTION ENGINES
                     Filed Jan. 6, 1939          2 Sheets-Sheet 1
Fig. 1.
Fig. 3.
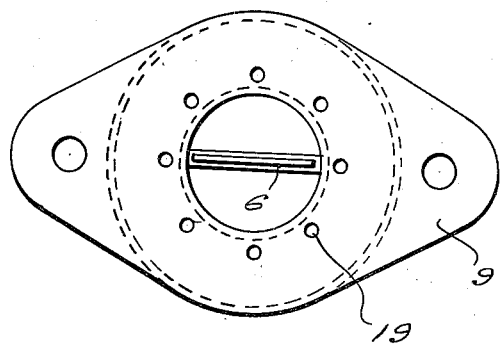
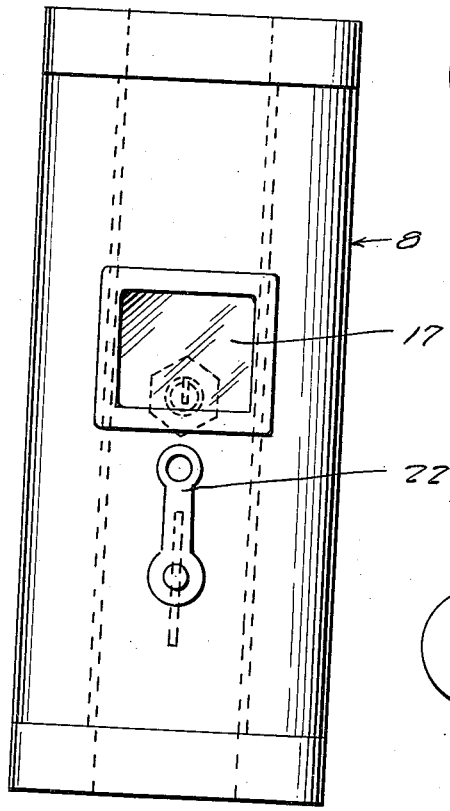
Fig. 4.
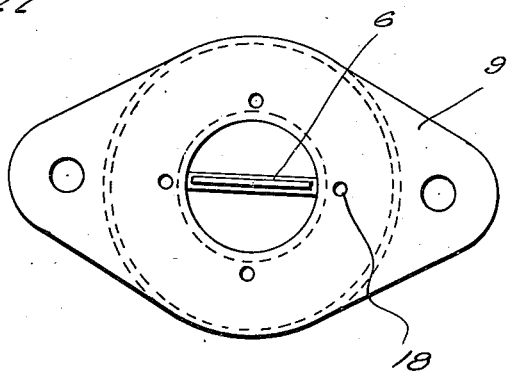
Inventor
Bert. R. Tucker
By Clarence A. O'Brien
and Hyman Berman
Attorneys

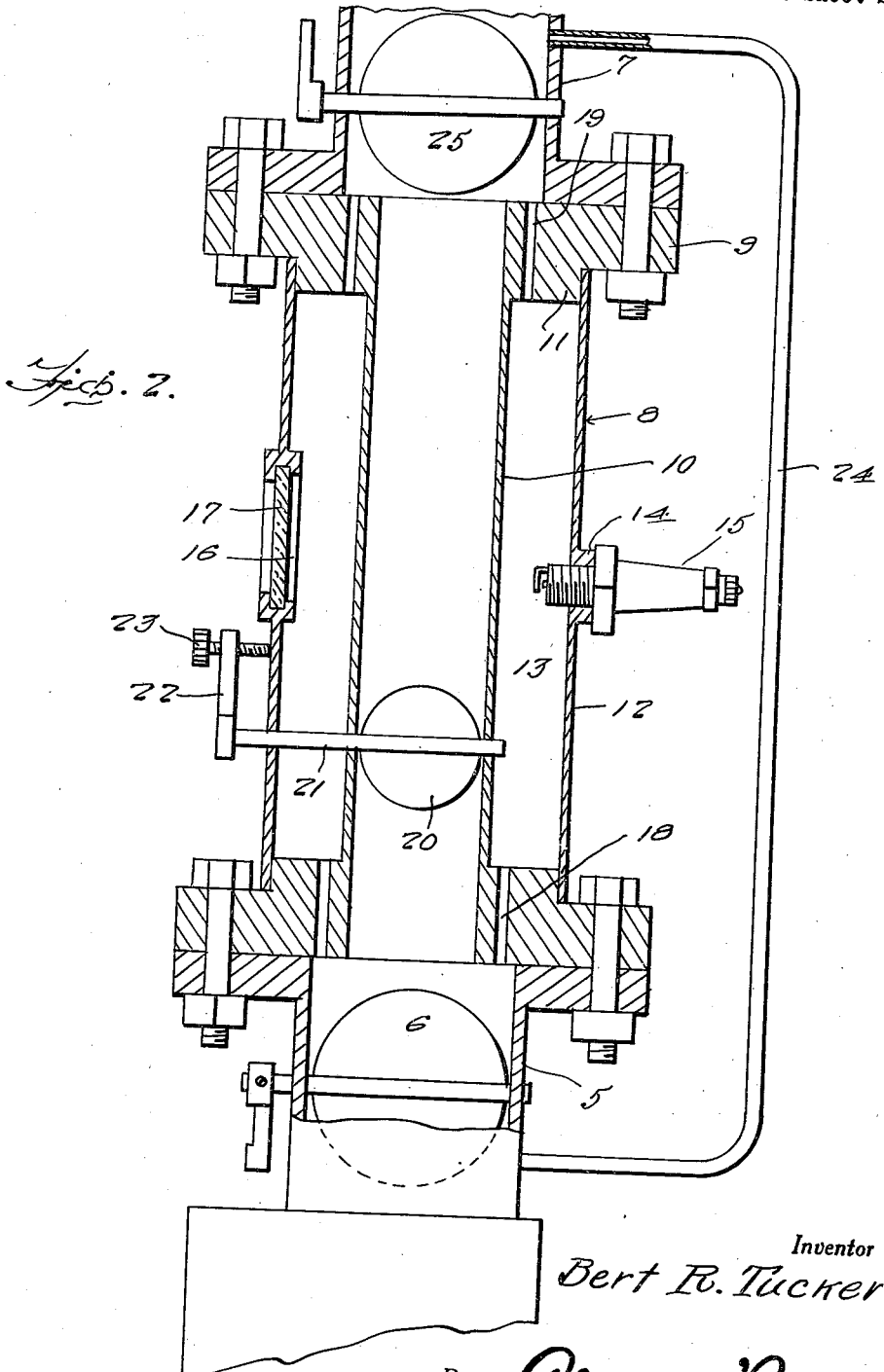

Patented July 29, 1941

2,251,084

UNITED STATES PATENT OFFICE 2,251,084

FUEL VAPORIZER FOR INTERNAL COMBUSTION ENGINES

Bert R. Tucker, Whiting, Ind.

Application January 6, 1939, Serial No. 249,643

2 Claims. (Cl. 48—107)

This invention relates to a fuel vaporizer for internal combustion engines, and has for the primary object the provision of a device of this character which will efficiently vaporize fuel before reaching an engine and after leaving the carburetor of said engine so that the engine may be successfully operated on low grade fuels and when operated on a high grade fuel will have its efficiency materially increased.

Another object of this invention is the provision of a unit which may be readily connected in between the carbureter and the intake manifold of the engine whereby a selected amount of the fuel mixture from the carbureter may be ignited and the heat therefrom employed for preheating the main flow of fuel mixture from the carbureter to the engine prior to reaching said engine and to introduce the products of combustion of the ignited fuel into the main flow of fuel mixture for the further heating thereof without igniting thereof prior to reaching the engine.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a vaporizing unit constructed in accordance with the present invention.

Figure 2 is a vertical sectional view illustrating the unit connected with a portion of an intake manifold of an engine and a portion of a carbureter of the engine.

Figure 3 is an end view of the unit.

Figure 4 is a view similar to Figure 3 showing the other end of the unit from that shown in Figure 3.

Referring in detail to the drawings, the numeral 5 indicates a fragmentary portion of a carbureter and 6 the control valve of said carbureter. The character 7 indicates a fragmentary portion of an intake manifold of an engine. The intake manifold and the carbureter are spaced from each other and connected to one another by the present invention which is in the form of a unit 8, having end plates 9 bolted onto the flanges of the carbureter and the intake manifold, as clearly shown in Figure 2. The end plates have centrally arranged bores and integral with the walls of said bores is an inner sleeve 10 forming a direct communication between the carbureter 5 and the intake manifold. The opposing faces of the end plates are provided with shoulders 11 and having frictional fit with said shoulders is an outer sleeve 12 coacting with the inner sleeve 10 and the end plates in defining a combustion chamber 13.

The outer sleeve 12 has an internally threaded boss 14 in which is mounted an ignition medium 15 preferably in the form of a conventional type of spark plug adapted to be connected in an electric circuit (not shown). This electric circuit forms a part of the engine and has included therein a coil preferably of the vibrator type so as to produce an intermittent and continuous sparking of the spark plug during the operation of the engine.

The outer sleeve 12, opposite to the boss 14 is provided with a sight opening 16 closed by a transparent panel 17 so that the ignition of the fuel within the chamber 13 may be viewed from the exterior of the unit 8.

The end plate which is mounted on the carbureter 5 is provided with a series of passages 18 which connect the chamber 13 to the carbureter and the end plate which is connected onto the manifold is also provided with a series of passages 19 so that the suction in the manifold 7 from the engine may enter the chamber 13 for drawing fuel mixture therein from the carbureter and to permit the products of combustion of said fuel after being ignited to pass into the intake manifold minus of any flame. It is preferable that the end plate on the manifold 7 have a greater number of passages 19 than the number of passages 18 in the end plate on the carbureter 5.

A control valve 20 is mounted in the inner sleeve 10 and includes a shaft 21 which extends through the inner and outer sleeve and has secured thereto an arm 22 carrying a set screw 23 adapted to be turned into engagement with the outer sleeve for holding the valve 20 in various positions for controlling the flow of fuel mixture through the inner sleeve from the carbureter to the intake manifold.

By adjusting the position of the control valve 20 in the inner sleeve 10 the volume of fuel flowing through the inner sleeve 10 may be varied and which will vary the amount of fuel entering the combustion chamber 13 of the unit 8. For instance, if the volume of the fuel flowing through the inner sleeve to the intake manifold from the engine is decreased, the volume of fuel entering the combustion chamber 13 will be increased, due to the increased suction in the combustion chamber 13 from the engine.

In operation, a certain amount of the fuel during the operation of the engine passes from the carburetor into the combustion chamber 13 and is ignited therein so that the heat from this burning fuel mixture will heat the inner sleeve 10 to preheat the fuel mixture passing from the carbureter by way of said inner sleeve to the manifold 7 of the engine. The products of combustion leave the combustion chamber 13 by way of the ports 19 and enter the intake manifold 10 for mixing with the fuel mixture therein to further heat said fuel mixture and thereby with the previous preheating of said fuel mixture bring about a complete vaporization thereof prior to reaching the engine, consequently providing more efficient operation of the engine and less formation of carbon deposits in the engine. The products of combustion passing through the passages 19 will be freed of flame so that no danger of igniting the fuel mixture in the intake manifold will be had.

Through the use of this unit and being connected to the carburetor and the intake manifold as previously described and shown in the drawings will permit the use of a fuel mixture for preheating the main flow of fuel mixture from the carbureter to the engine by the igniting thereof which brings about burning of said fuel mixture, creating a maximum amount of heat to raise the temperature of the inner sleeve and consequently raise the temperature of the fuel mixture passing therefrom and to a temperature which will assure a complete vaporization thereof.

A tube 24 connects the fuel passage of the carbureter 5 with the intake manifold 7 for maintaining the engine operating at idling speed when all of the valves are closed. The intake manifold 7 may be provided with a control valve 25 only to be used when a high grade of fuel such as gasoline is being employed. The carbureter valve 6 at this time would be secured in an open position so that the amount of fuel entering the engine then will be controlled by the valve 25 and which would also control the amount of vacuum from the engine acting to draw the gasoline type of fuel into the chamber 13 for burning, less vacuum being needed for gasoline type fuel than the low grade of fuel. While it has been stated that the valve 25 is mounted in the intake manifold 7, a separate unit (not shown) containing the valve 25 may be connected between the unit 8 and the intake manifold.

It is believed that the foregoing description, when taken in connection with the drawings will fully set forth the construction and advantages of this invention to those skilled in the art to which such invention relates, so that further detailed description will not be required.

What I claim is:

1. A heater and vaporizing device for an internal combustion engine comprising a straight inner sleeve, end plates connected with the ends of the sleeve, one plate adapted to be connected to an intake manifold of an engine and the other plate adapted to be connected to a carbureter, said sleeve forming an unobstructed passageway between the carburetor and said manifold, each plate having an annular row of holes therein surrounding an end of the sleeve, with the holes of one plate in communication with the carburetor and the holes of the other plate in communication with the manifold, a sleeve supported by the end plates and surrounding the first sleeve and forming with this first sleeve an annular chamber for receiving fluid passing through the holes of one plate with the holes of the other plate forming discharge means for the chamber, means for igniting the fuel in the annular chamber and valve means in the inner sleeve for controlling the flow of fluid therethrough.

2. A heater and vaporizing device for an internal combustion engine comprising a straight inner sleeve, end plates connected with the ends of the sleeve, one plate adapted to be connected to an intake manifold of an engine and the other plate adapted to be connected to a carbureter, said sleeve forming an unobstructed passageway between the carburetor and said manifold, each plate having an annular row of holes therein surrounding an end of the sleeve, with the holes of one plate in communication with the carburetor and the holes of the other plate in communication with the manifold, a sleeve supported by the end plates and surrounding the first sleeve and forming with this first sleeve an annular chamber for receiving fluid passing through the holes of one plate with the holes of the other plate forming discharge means for the chamber, means for igniting the fuel in the annular chamber and valve means in the inner sleeve for controlling the flow of fluid therethrough, and a by-pass tube connecting the carburetor with the manifold and by-passing the sleeves.

BERT R. TUCKER.